United States Patent

[11] 3,566,129

[72] Inventors Francis G. Bardwell
Elmhurst;
Richard A. Mazur, Chicago, Ill.
[21] Appl. No. 819,787
[22] Filed Apr. 28, 1969
[45] Patented Feb. 23, 1971
[73] Assignee Stewart-Warner Corporation
Chicago, Ill.

[54] PATTERN CATCHING IN A PHOTOELECTRIC PATTERN CONTOUR TRACING SYSTEM
21 Claims, 10 Drawing Figs.

[52] U.S. Cl. .................................................. 250/202,
250/219, 318/18
[51] Int. Cl. ........................................................ G01n 21/30;
G05b 1/00
[50] Field of Search .......................................... 250/202,
219, 206; 318/18; 340/146.3; 178/6, 7.6

[56] References Cited
UNITED STATES PATENTS
2,999,938 9/1961 Hann et al. ................... 250/202

| 3,124,691 | 3/1964 | Brouwer | 250/219X |
| 3,213,282 | 10/1965 | Brouwer | 250/202 |
| 3,286,142 | 11/1966 | Redman | 318/18 |
| 3,398,283 | 8/1968 | Diprose | 250/202 |

*Primary Examiner*—John Kominski
*Assistant Examiner*—E. R. LaRoche
*Attorneys*—Augustus G. Douvas, William J. Newman and Norton Lesser ABSTRACT: A pattern contour-tracing system which is capable of intercepting and locking on the pattern contour from a position removed from the contour without the use of a leadin contour. The pattern contour-sensing head is pointed so as to travel in a line toward the contour with the sensing head steering means locked out until the sensing means detects that the sensing is within a predetermined distance of the contour. The steering means is then unlocked so that the sensing head can be automatically steered by the servo means to make a smooth transition into the path defined by the pattern contour. A photosensitive tracing system is disclosed which is operable to lead into and trace the pattern contour whether the contour is defined by a line or an edge.

INVENTORS
Francis G. Bardwell
Richard A. Mazur

By *William J. Newman*
ATTORNEY

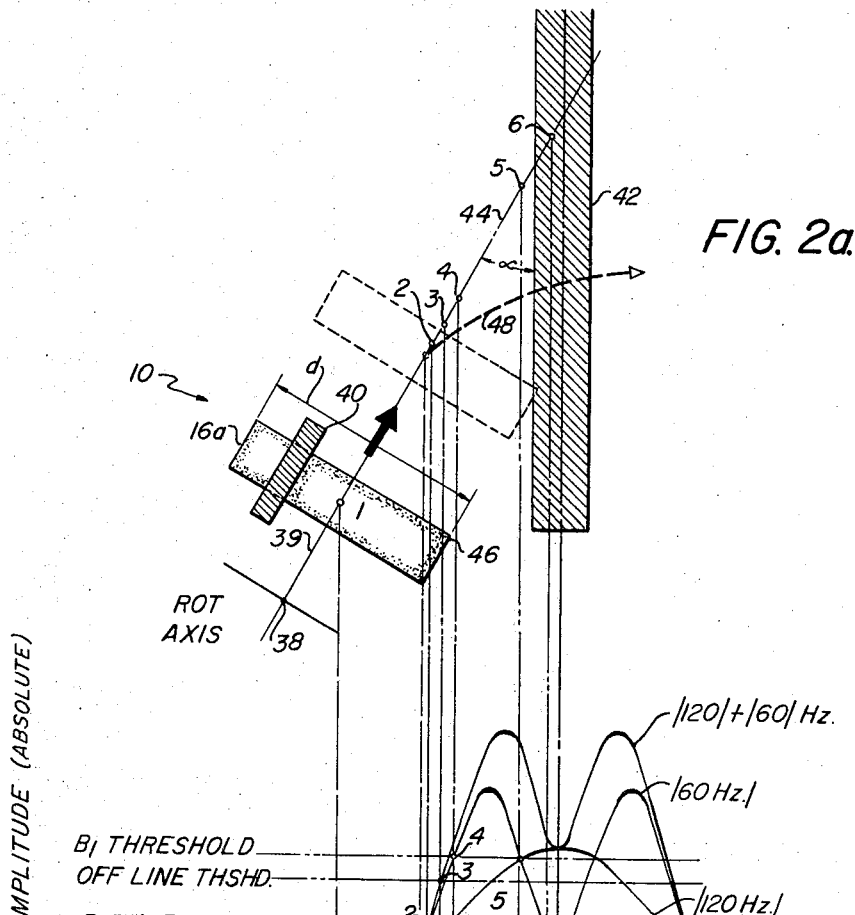
FIG. 2a.
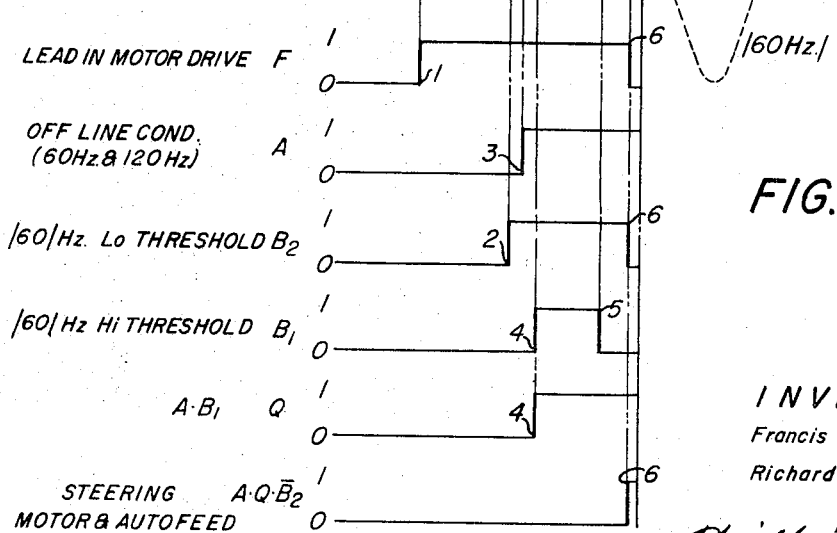
FIG. 2b
FIG. 2c
INVENTORS
Francis G. Bardwell
Richard A. Mazur
ATTORNEY

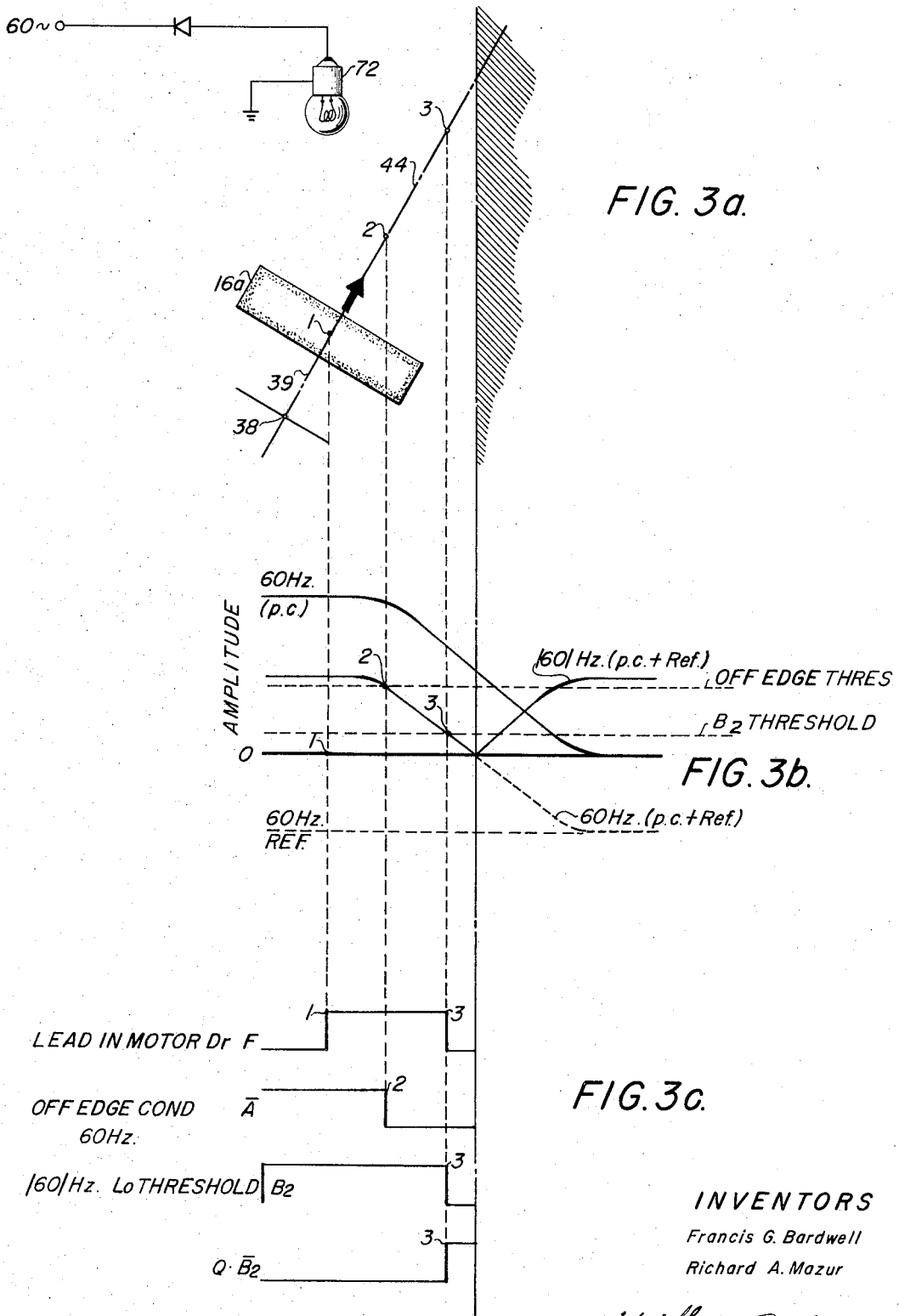

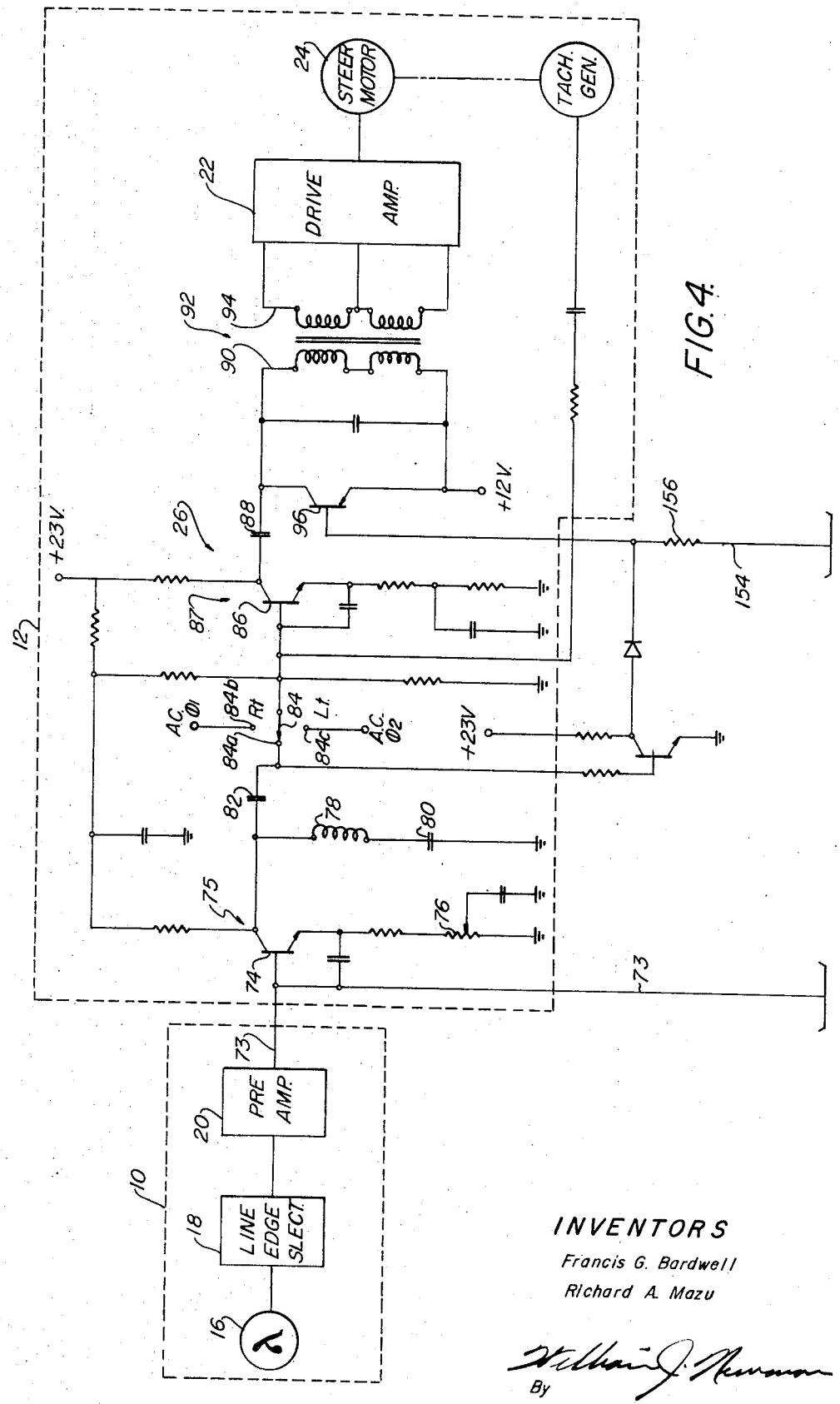

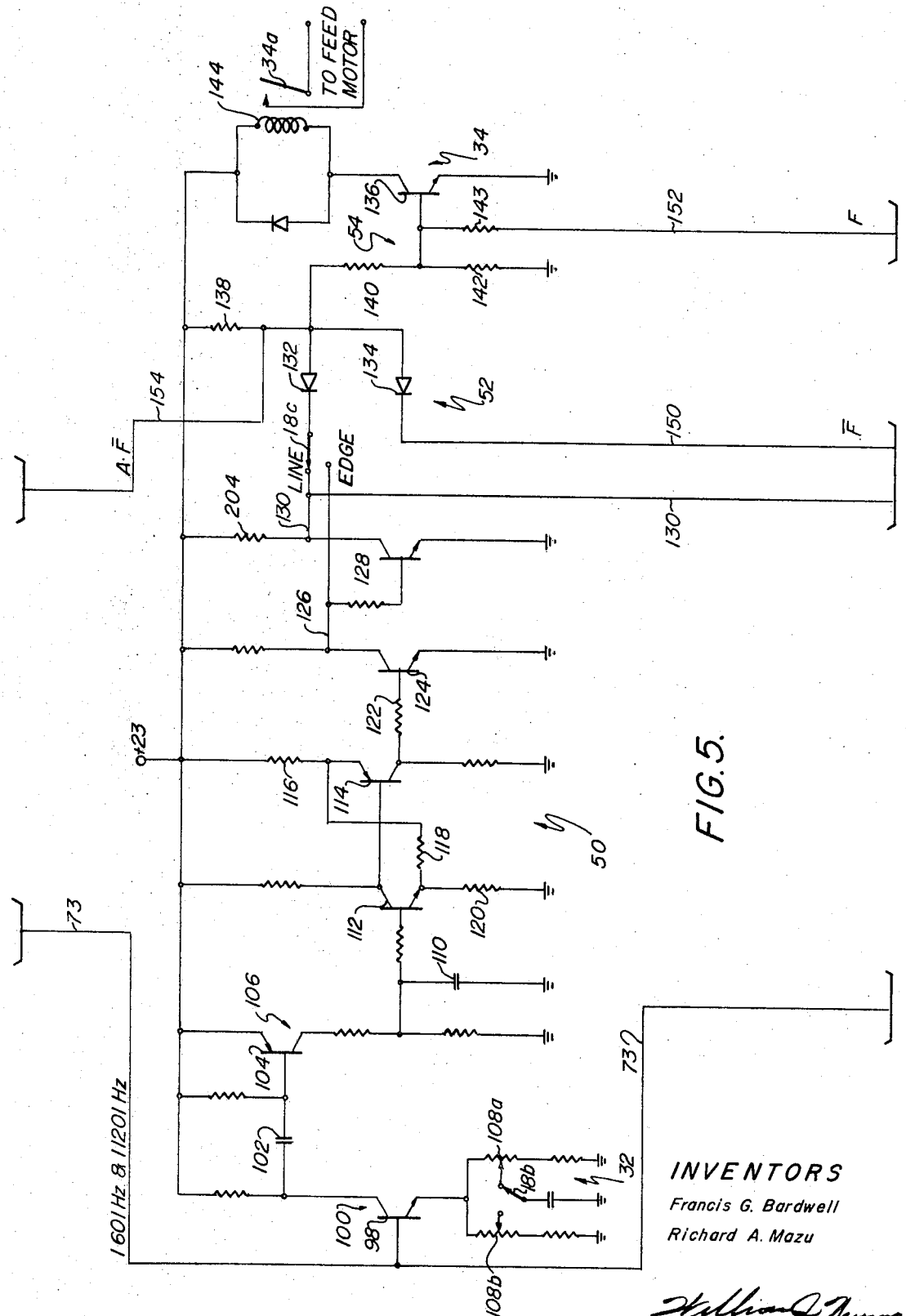

3,566,129

PATTERN CATCHING IN A PHOTOELECTRIC PATTERN CONTOUR TRACING SYSTEM

BACKGROUND OF THE INVENTION

This invention relates to a pattern contour-tracing system and more particularly to such systems with control means for automatically directing pattern contour-sensing head onto a contour without the use of lead-in contours on the pattern.

Although there are many contour tracing systems known in the art, there have been no significantly successful means for enabling a tracing head and its slave work tool to automatically lead onto the pattern contour along a smooth transitional path. Examples of photoelectric systems which are adaptable to this invention are disclosed in U.S. Pat. Nos. 3,124,691; 3,213,282 and 3,286,142, all owned by the common assignee Stewart-Warner Corporation. By the very nature of contour tracing systems, the leadin problem is an inherent one which has heretofore not been easily corrected.

The most widely used tracing systems of today have a sensing means such as one or more photocells, at least one of which is positioned so as to view a portion of the tracing pattern slightly forward of the steering axis of the rotation of the sensing head. This is required to give the system proper steering sense in the same manner and for the same purposes that a motor vehicle operator trains his eyes on the road at a substantial distance in front of the vehicle rather than at a spot close to the steering axis of the front wheels. When the sensing means indicates a positional deviation from the contour steering means it causes the sensing head to rotate the sensing means towards the contour. In this manner the sensing head traces along the contour, and the steering axis to which the work tool is fixed follows closely behind to cut the contour from the workpiece in accordance with the tracing pattern.

During leadin procedures, however, when the tracing head is approaching the contour from a position off of the contour, the sensing means will eventually sense the contour and, because of its nature, give an indication to the steering means to turn the head towards the contour. If the angle of approach to the contour is substantial and the feed rate of the tracing head is great enough with respect to the speed of rotation of the head, the head can proceed completely across the pattern without ever locking in on it. If the tracing system has an off pattern control as in the system disclosed herein, the tracer may come to a complete stop on the other side of the pattern from which it approached. If the sensing head of the tracer approaches the contour at a somewhat lesser angle, it might overshoot the pattern by a small amount before it locks onto it. This is, the tracing head would cross the line slightly and then reverse directions so as to lock onto the pattern and thus cause the work tool attached thereto to distort the pattern cut from the workpiece. Some of the prior art systems could be made to lead into the contour properly, but only if the tracing head was steered onto the pattern at a very slight angle with the contour thereto. Because of these problems, machine operators usually have used manual procedures to steer the tracing head onto the pattern. The operator causes the head to approach the pattern at an angle of perhaps 10° or less with respect to the contour and then manually holds the tracing head from turning by means of a steering wheel until the sensing head catches the pattern, at which time he releases his hold of the wheel and permits the automatic steering control to guide the tracing head.

SUMMARY OF THE INVENTION

The present invention permits the automatic leadin of the tracing head onto the pattern contour without the aid of leadin contours on the pattern and without the manual control of the operator. The system enables the tracing head to approach and lock onto the pattern contour in a positive manner without losing or overshooting the contour. Included in the system are control means for catching the pattern which comprises means for pointing the front-to-back axis of the tracing head toward the contour and means including the tracer driving means for driving the tracer in the direction of the front-to-back axis toward the contour. Means are provided for detecting when the sensing head reaches a position which is a predetermined distance from the contour, and means responsive to the detecting means are utilized to prevent the operation of the automatic tracer head steering means until the sensing head reaches the predetermined distance position. If the tracing system is of the optical type in which sensing head position is determined by the electric response of the photosensitive means, the predetermined distance at which the tracer and steering means are made operable is determined by the magnitude of the electric response of the photosensitive means. In the preferred embodiment shown and described herein, the system is adaptable to be operable whether a line or an edge forms the pattern contour. In the case of line tracing, however, special provisions are made to eliminate ambiguities which could cause the steering means to be enabled too soon as it approaches the line, as will become more clear from the following description of the line-tracing embodiment.

It is to be understood that although optical tracers are discussed herein the broadest aspects of the invention can be applied to other types of tracers including mechanical feeler types, cathode ray sensor types, etc.

This invention will be better understood by a further reading of the following description, especially when taken in line with the accompanying drawings in which:

FIG. 2a is a diagrammatic representation of a line tracer approaching the line;

FIG. 2b is a graphical representation of the signal amplitude variations as the tracer of FIG. 2a approaches the line;

FIG. 2c is a graphical representation of the logic functions performed by the system as the tracer of FIG. 2a approaches the line;

FIG. 3a is a diagrammatic representation of an edge tracer as it approaches an edge;

FIG. 3b is a graphical representation of the signal amplitudes as the tracer of FIG. 3a approaches the edge;

FIG. 3c is a graphical representation of the logic functions of the system as the tracer of FIG. 3a approaches the edge; and FIGS. 4 through 6 are schematic diagrams of the line and edge tracing system shown in block diagram in FIG. 1.

Figure 1:
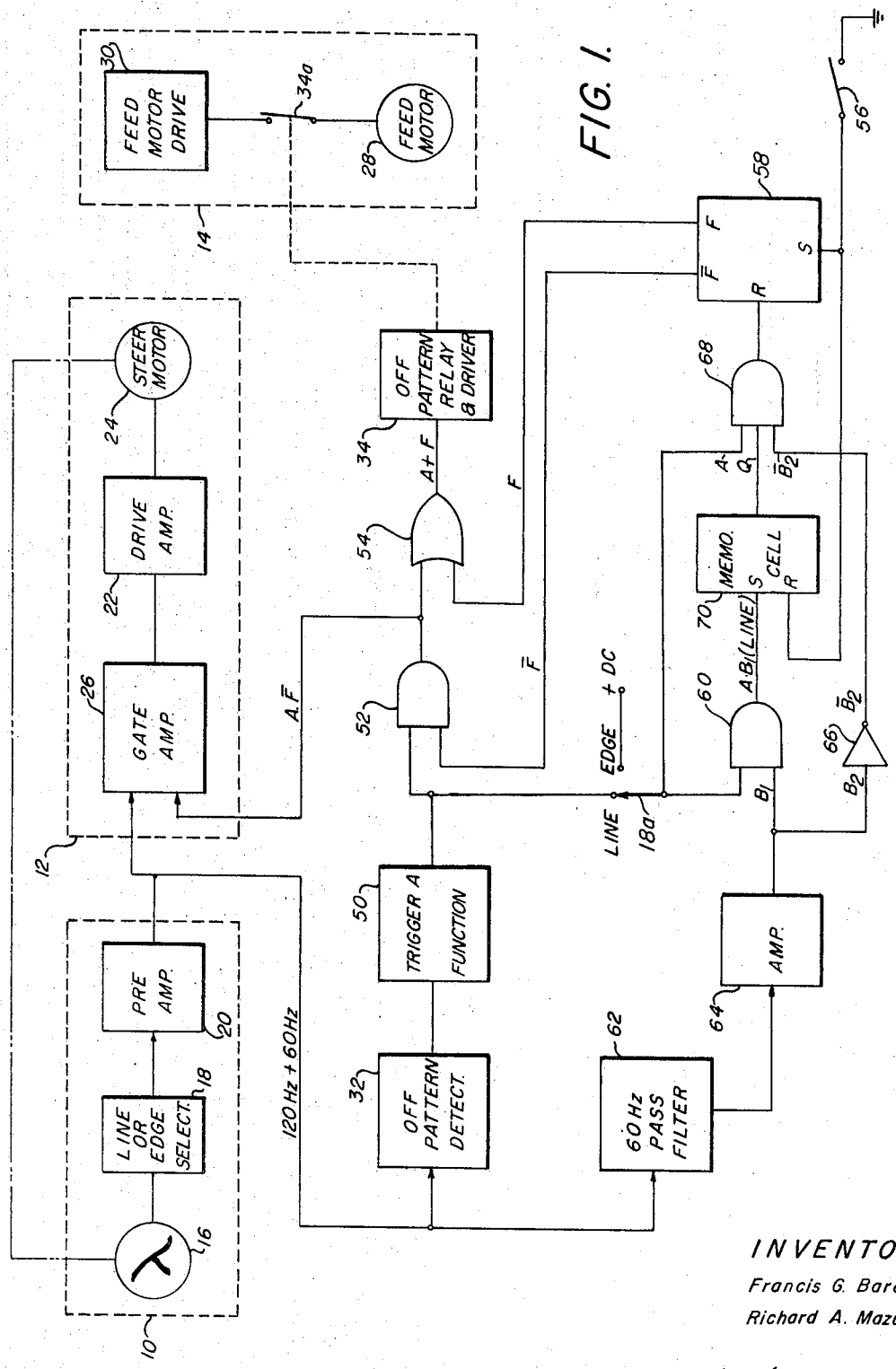
FIG. 1 is a block diagram of a line and edge-tracing system embodying the pattern-catching techniques of this invention.

The system shown in block diagram in FIG. 1 indicates the basic functions of the invention and the means for performing same as they may apply to one of the more simple pattern-tracing systems. The basic tracing system is of a type such as disclosed in the aforementioned Redman U.S. Pat. No. 3,286,142 which includes a pattern-sensing head 10, steering means 12 for rotating the sensing head 10 to cause it to follow the path defined by the pattern contour, and driving means 14 for causing the sensing head to advance along the pattern contour.

The sensing head 10 comprises means for sensing the pattern contour such as one or more photocells 16. Although the preferred embodiment of the invention disclosed herein is directed to optical tracers having photocells, it is to be understood that the broadest aspects of this invention are applicable to other types of tracers including cathode ray tube-scanning tracers and mechanical feeler tracers. The scanning head of the aforementioned Redman patent includes single photocell 16 which views the pattern contour and develops electric signals in accordance with deviations therefrom in a well-known manner which will be more fully explained with respect to FIGS. 2a and 3a. The Redman patent system is capable of following either a thin line or an edge as determined by the operational mode of a line-edge selector 18. The photocell signals are amplified by a preamplifier 20 and provided to the sensing head steering means which serves to rotate the sensing head in accordance with the photocell signals. The signal from the sensing head is passed through a gated amplifier 26 and is amplified by a drive amplifier 22 which controls the operation of a steering motor 24 to rotate the sensing head 10. The gated amplifier 26 in the steering means 12 is provided to permit the passage of the sensing head signals to the drive-steering amplifier only under the desired condition when the sensing head is within a predetermined close proximity of the pattern contour, as will be described hereinafter.

The steering motor 24 is coupled mechanically or electrically to the driving means 14 so as to cause the sensing head 10 to be driven in the proper direction along the pattern contour. In the case of the system of the aforementioned Redman patent, the driving means is geared to the steering means for rotation thereby and includes a traction wheel (not shown) which is driven by a feed motor 28. The drive motor is energized by feed motor drive circuit 30 which may include manual means for selecting the desired feed speed of the tracer about the contour. It is to be understood, however, that other drive means may be used such as a coordinate drive system in which two motors operate independently to drive the sensing head in respective directions responsive to properly resolved signals to follow along the pattern contour.

The Redman system also includes an off-pattern detection system which causes the tracer to stop its motion whenever the sensing head strays off the pattern contour. Such a system includes an off-pattern detection circuit 32 and an off-pattern relay and driver circuit 34 which operate to open the circuit between the feed motor 28 and the feed motor drive circuit 30 when the signal at the output of the sensing head preamplifier 20 indicates that the sensing head is not viewing a segment of the pattern contour. The functional components between the off-pattern detection circuit 32 and the off-pattern relay driver circuit 34 as well as the remaining functional components in FIG. 1 not heretofore mentioned are utilized to complete the pattern catching control system for enabling the tracer to lead into the pattern contour in accordance with this invention and will be described in more detail hereinafter.

Reference is now made to FIGS. 2a, 2b and 2c for a better understanding of the operating principles of this invention, especially as it applies to an optical-type tracer for following along a thin line such as disclosed in the aforementioned Brouwer and Redman patents. As schematically shown in FIG. 2a, the sensing head 10 comprises a photocell as represented by its photosensitive area 16a which is optically positioned to view a portion of the pattern slightly in advance of the rotational axis 38 of the sensing head 10. An opaque shade 40 is caused to oscillate between the sensitive area 16a and the pattern image in the direction indicated by the arrowed line referenced d. The shutter 40 travels to the limits indicated by the reference line d on either side of the center of scan which normally defines the front-to-back axis 39 of the sensing head at a carrier frequency of, for example, 60 hertz.

The steering means of the tracer system operates in response to the fundamental component signal (60 hertz) to rotate the tracer-sensing head about its axis 38. Thus, if a portion of the line is viewed by the sensitive area 16a to the right of the front-to-back axis 39, the steering means will cause the sensing head 10 to rotate in a clockwise direction about the axis 38. On the other hand, if the line is viewed to the left of the front-to-back axis 39, the sensing head 10 is ordinarily caused to rotate in a counterclockwise direction. In this manner the rotational axis 38 will be caused to travel essentially down the center of the pattern line 40 to accurately trace the desired contour.

The graphs of FIG. 2b are representative of the amplitudes of the fundamental reference frequency (60 hertz) and the second harmonic of the reference frequency (120 hertz) in the photocell output signal as the tracing head travels in the direction of its front-to-back axis 39 towards the thin line 42 representing the pattern contour. As may be seen, when the tracing head is positioned such that an image of the line is not projected on the sensitive area 16a, as indicated by the center of the photosensitive area at position 1, there is no 60 hertz or 120 hertz signal present in the photocell output. However, as the sensitive area 16a proceeds along the path indicated by the dotted line 44, both a 60 hertz component and a 120 hertz component will begin to be generated when the sensitive area 16a encounters the pattern line 42 at its right side 46. As it proceeds further along the path 44 so that more of the line 42 is projected onto the sensitive area 16a, the amplitude of the fundamental and second harmonic signals continue to increase with the 120 hertz signal reaching a maximum when the center of scan is positioned over the center of the line 42. The 60 hertz component, however, reaches a maximum and then falls to zero as the sensing head approaches the center of the line 42, in the manner described more fully in the aforementioned patents. As is well known, there is a 180° phase shift in the fundamental frequency component as the tracing head passes from one side of the center of the line 42 to the other, and it is this phase shift which is used to give the tracing system directional sense.

FIG. 2b also includes a curve representing the additive result of the absolute amplitudes of the 120° hertz and the 60 hertz signals. This signal is used by the off-pattern detector 32 (FIG. 1) to determine when the tracer is straying off the line. That is, as long as the absolute amplitude of the 60 hertz plus 120 hertz signal is above the off-line threshold level in FIG. 2b as the tracer is following a line, the off-line circuits will maintain the driving means in operation. If the tracer strays from the line such that the 60 hertz plus 120 hertz signal level falls below the off-line threshold level, the driving means will be caused to stop.

The problem to which this invention is directed occurs when an operator is trying to direct the tracer to the pattern contour from a position off the contour at the beginning of the tracing operation. When the sensing head 10 is approaching the line 42 in the manner shown in FIG. 2a along the path 44, the sensitive area 16a will first encounter an image of the pattern line 42 at its right side 46. As previously stated, this will cause the steering means to rotate the sensing head 10 in a clockwise direction. Thus, the sensing head has a tendency to follow along the path indicated by the dotted line 48 toward the pattern line, and under certain circumstances might even cross the line completely and end up on the right side of the line 42 with the photocell signal indicating to the off-line circuit that the tracer driving means should be shut down. The strength of this tendency to cross the line is a direct function of the angle alpha between the line of approach 44 and the pattern line 42. In previous systems the tracer was prevented from crossing the line by the operator manually holding the sensing head to prevent rotation until the head was on the line.

The system of the present invention overcomes this problem by preventing the steering means from turning the sensing head 10 as it approaches the line 42 along the path 44 until the system detects that the center of the sensitive area 16a is at a position very close to the center of the line 42 as might be represented by point 6 along the path 44 in FIG. 2a. It detects the position 6 as the line tracer approaches the pattern line 42 by detecting the point at which the absolute amplitude of the fundamental 60 hertz signal falls below a predetermined threshold value indicated $B_2$ at the corresponding point 6 on FIG. 2b. At that point the steering means is gated into action and the tracing head will then take a smooth transitional path onto the line 42.

It will be noted in FIG. 2b that the absolute amplitude of the 60 hertz signal will also be below the $B_2$ threshold level as long as the center of the photosensitive means has not yet reached the point referenced 2 on the path 44 to the pattern line 42. Special care must therefore be taken to maintain the steering means deactivated until the condition which provides a greater absolute amplitude of the 60 hertz signal. The off-line threshold and the $B_1$ threshold are used to detect this condition in a manner to be hereinafter described.

Attention again is drawn to FIG. 1 for a description of the logic functions by which the detection of the conditions represented by position 6 in FIGS. 2a and 2b are detected to render the steering means operable to control the rotational position of the sensing head 10.

At the start of operation when the tracing head is at an at rest mode and the scanning head 10 is positioned so that the photosensitive means 16 is not viewing the pattern line, the off-pattern detector 32 does not receive a 60 hertz or a 120 hertz signal from the output of the preamplifier 20. Thus, the off-pattern detector maintains a trigger function circuit 60 in a condition such that its A output is zero. And gate 52 is therefore closed and no signal emanates therefrom through OR gate 54 to the off-pattern relay and driver 34. The A function represents the status of the off-pattern detector in that a pattern contour is being viewed when the A function is in its 1 state and the contour is not being viewed when the A function is in its zero state.

The F input to the OR gate 54 is also at a zero condition before the start of operations so that the off-pattern relay and driver 34 maintains the feed motor 28 deenergized. To drive the sensing head to the line it is desired that the driving means 14 operate in spite of the fact that the sensing head is not viewing the line and this is accomplished by the operator physically pointing the sensing head towards the line and actuating the start switch 56. The momentary closure of switch 56 sets a flip-flop 58 so that its F output changes to a 1 condition which is fed through the OR gate 54 to the Off-pattern relay driver circuit 34 causing the energization of the feed motor 28 by the closure of relay contact 34a. The steering means 12 is prevented from rotating the sensing head 10 at this time, however, because the AND gate 52 is kept closed because of the zero state of the A output of trigger function 50 and the zero state of the F̄ output of the flip-flop 58. The AND gate 52 controls the gate 26 in the steering means and will maintain that gate closed until the simultaneous status of the detection of the pattern line by the sensing head represented by the 1 state of the A output of trigger function 50 and the arrival of the sensing head at the position 6 (FIGS. 2a, 2b) which, as will be seen later, is represented by a 1 state at the F̄ output of the flip-flop 58. The momentary closure of switch 56 also resets a memory cell 70 (FIG. 1) to provide a zero condition at its Q output, the purpose of which will be better understood later. The position at which the operation is started by the operator's actuation of switch 56 is indicated as point 1 in the representations of FIGS. 2a, 2b and 2c.

As the sensing head 10 proceeds along the path 44 towards the pattern line 42, the photosensitive means will encounter a portion of the line at its right side 46 and the amplitude of the 60 hertz, the 120 hertz and the 60 hertz plus 120 hertz signals will start to increase as indicated in FIG. 2b. When the sensing head reaches the position 2 on the path 44, the 60 hertz signal reaches the $B_2$ threshold level. The $B_2$ level is detected by the logic circuits in FIG. 1 wherein the fundamental or 60 hertz component of the scanning head signal is passed through a filter 62 (FIG. 1) and an amplifier 64 to the input of an inverter circuit 66. As will be seen in the detailed description of the circuit 66, it operates to feed a 1 condition to an input of AND gate 68 when the level of the 60 hertz signal is below the $B_2$ threshold level and a zero condition when it is above the $B_2$ level. The gate 58 controls the resetting of flip-flop 58 which in turn controls the normal operation of the tracer steering means and the driving means. Thus, the zero condition of the $\overline{B2}$ function will maintain the gate 68 closed as long as the 60 hertz signal is above the $B_2$ level. The AND gate 68 is kept closed during the period before the $B_2$ level is reached by a zero condition at the Q output of the memory cell 70 to the AND gate 68, thus providing a blocking function during this ambiguous portion of the cycle.

The progress of the sensing head along the path 44 beyond point 2 causes the signal levels to further increase. When the position 3 is reached a sufficient portion of the line 42 is scanned by the photosensitive means to provide a 60 hertz plus 120 hertz signal of the off-line threshold amplitude. At this point the off-line detector 32 causes the trigger function circuit 50 to switch to its 1 condition at the A output, but this has no effect on the operation of the AND gate 52 because of the zero state of the F̄ line from the flip-flop 58. The 1 state of the trigger A function does however prepare one input to the AND gate 68 and an input to a gated AND circuit 60 through a set of switch contacts 18a associated with the line-edge selector 18 in the sensing head 10. The other input of the gated AND 60 receives the 60 hertz component of the sensing head signal from the amplifier 64. The gated AND circuit 60 is adjusted to open only when the amplitude of the signal from the amplifier 64 reaches the B1 threshold level indicated in FIG. 2b provided, of course, that the online trigger A function signal is received.

As the tracer proceeds further along the path 44 to the point 4, the B1 threshold level is reached which opens the gated AND circuit 60 to provide a set signal to the memory cell 70. The Q output of the memory cell 70 goes to its 1 condition removing the blocking function at the input to the AND gate 68. Although the A function of the trigger circuit 50 is also in the 1 condition, the gate 68 is now inhibited because of the zero condition of the $\overline{B2}$ function at its third input.

The gate 68 will remain inhibited and no further logic functions will occur until the amplitude of the 60 hertz signal falls past the B1 threshold, which occurs at position 5 of the FIG. 2 representations, to the B2 threshold level which occurs at position 6. At that time the gate 68 opens and resets flip-flop 58. The F output thereof goes to a 1 condition opening AND gate 52 which in turn opens the gated amplifier 26 in the steering means 12 to permit the steering motor 24 to be energized in accordance with the sensing head output signal. The F̄ output of the flip-flop 58 which controls the operation of the off-pattern relay and driver 34 through the OR gate 54 goes to its zero condition, but the circuit 34 still receives an enabling signal from the output of the AND gate 52 through the OR gate 54. Thus, the off-pattern relay contacts 34a will remain closed to energize the feed motor 28 and will stay that way unless and until the off-pattern detector 32 indicates that the sensing head has lost the pattern line.

The sequence of the logic functions of the system operating in the line-tracing mode are shown in the representations of FIG. 2c and are related to the various positions of the sensing head as it moves along the path 44 by the referenced numbers 1—6. It may be seen that the logic functions are organized such that the line-catching system will operate over a wide range of settings of the off-line threshold level. That is, the system will properly operate whether the off-line threshold is above, below, or between the B1 and B2 levels as long as the B2 level is below the B1 level. The off-line A function does make the system fully insensitive to noise such as would be caused by random dirt spots on the pattern, provided, however, that the off-line threshold is above the maximum noise level one can expect from such dirt spots. Therefore, the off-line A function operates to inhibit the passage of any signals from the amplifier 64 to the memory cell 70 prior to the recognition of the line.

As previously indicated, the pattern-catching techniques of this invention are also applicable to an edge-tracing system. The representations in FIGS. 3a, 3b and 3c will help to understand the functional operations of the edge tracer system to follow a smooth transitional path onto the edge. The particular-type edge tracer represented herein is one such as shown in the aforementioned Redman patent which is convertible from a line tracer. It uses the same sensitive area 16a which is positioned forward of the rotational axis 38 in the direction of the front-to-back axis 39, but the vibrating shutter is not used. Instead a pulsating light source 72 is used which illuminates the pattern at the reference frequency of, for example, 60 light pulses per second.

In this type of an edge tracer the signal at the output of the photocell comprises the fundamental component but no second harmonic. The 60 hertz signal goes from a maximum amplitude state when the photocell is viewing only the white side of the edge to a minimum or zero amplitude when the photocell is viewing only the black side of the edge. To give the system direction sense the photocell output is mixed with a 60 hertz reference signal which is approximately half the amplitude of the maximum signal when the photocell is viewing the white side of the pattern with its phase shifted 180° from the photocell signal. The resultant is a 60 hertz signal the amplitude and phase of which are indicative of the amount and direction of deviation of the center of the photocell from the image of the pattern edge. The edge-catching control operates on the absolute amplitude of the 60 hertz signal made up of the photocell signal plus the reference signal so that it is operable whether the tracer is approaching the edge from the black portion of the pattern or the white portion.

As in the case of the line tracer, the steering means 12 is maintained inoperable as the tracer approaches the edge until the absolute amplitude of the 60 hertz signal drops below the B2 threshold. In contrast to the line-tracing situation, however, there is no ambiguous condition since the absolute amplitude of the 60 hertz signal is always above the B2 threshold except for when the sensing head is within the very narrow portion of the pattern on either side of the pattern edge. This, in the edge tracing mode only the B2 signal is relevant to the logic operation of the pattern catching system. The off-line A function and the B1 threshold are not required, but as will be seen, they must be accommodated in the embodiment shown because of its operation as a line or edge system.

Referring again to FIG. 1, when the system is adapted for edge tracing, the selector 18 is switched to its edge-tracing mode with the switch contacts 18a residing in the edge position. As before, the tracer is started towards the edge from the position off the edge by a momentary operation of the start switch 56. The flip-flop 58 is set so as to deactivate the steering means 12 and activate the driving means 14 to cause the sensing head 10 to be driven towards the edge in the direction manually set by the operator. The reset of flip-flop 58 is controlled only by the status of the $\overline{B2}$ signal in the edge mode in view of the permanent A=1 condition provided through the switch contacts 18a to inputs of the AND gate 68 and the gated AND circuit 60. Since the sensing head signal is at a maximum level when the tracer is completely off of the edge the output of amplifier 64 exceeds the B1 level and the gate 60 insures that the memory cell 70 provides a high Q signal to the gate 68. With the two upper inputs of gate 68 in the high or "1" state, its output will be dependent only on the level of the $\overline{B2}$ signal at its third input. As the tracer proceeds along the path 44 and starts to view the edge, the A function of the trigger circuit 50 goes to its 1 state to prepare the AND gate 52. This is the condition at the position referenced 2 in FIGS. 3a, b and c. As the tracer proceeds on, point 3 is reached which represents the position at which the amplitude of the 60 hertz signal falls below the B2 threshold level. The $\overline{B2}$ inhibit is removed from the gate 68 causing it to open and reset the flip-flop 58. As in the line-tracing case, the reset of flip-flop 58 enables the steering means 12 to permit the steering motor 24 to rotate the sensing means 10 in accordance with the sensing head signals, and permits the off-pattern circuits to control the operation of the driving means 14.

Figure 6:
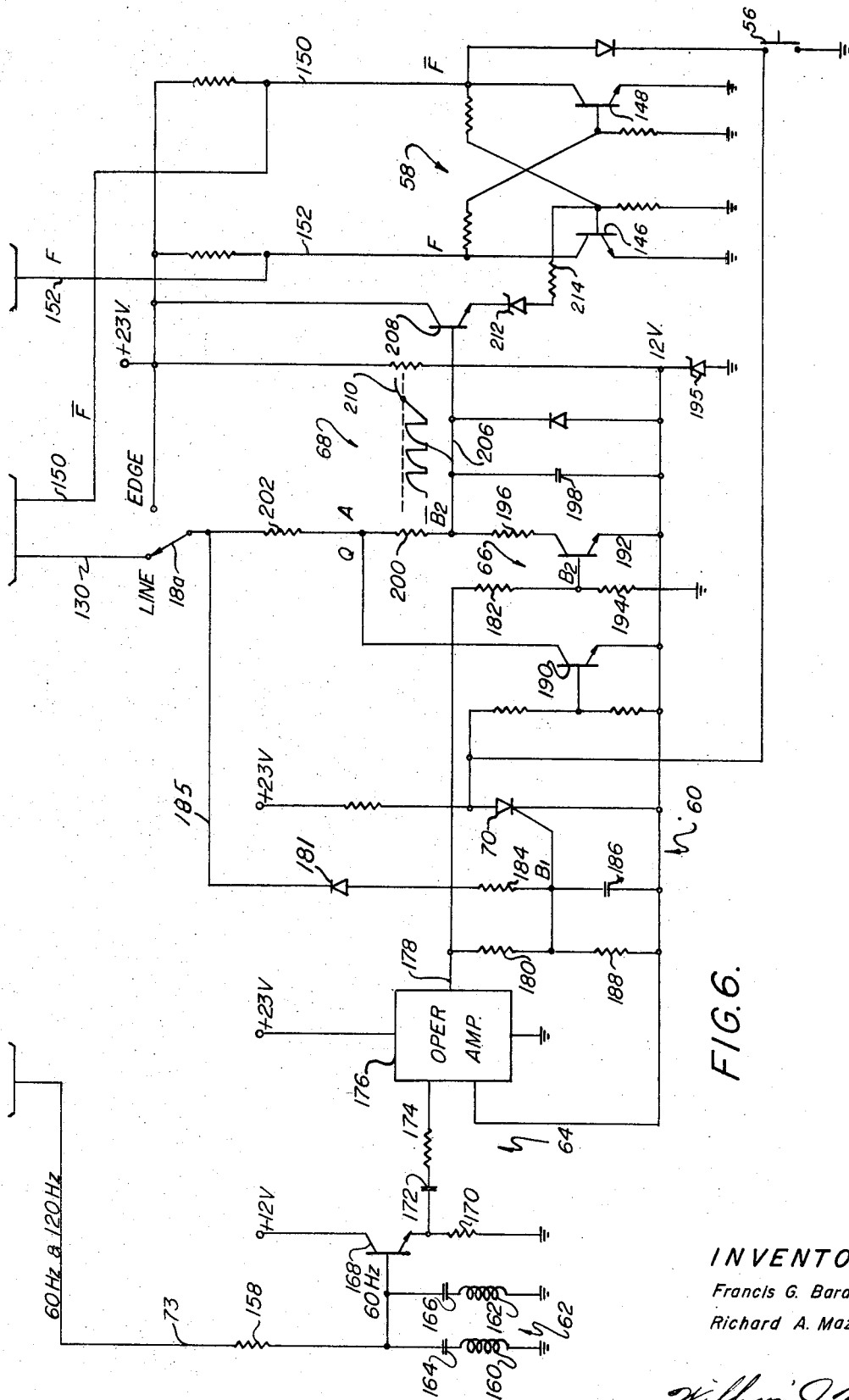

Reference is now made to FIGS. 4, 5 and 6 for a detailed description of the schematic circuit of a preferred embodiment of the line or edge-catching control system The sensing head 10, with its photoelectric means 16, the line-edge selector 18 and preamplifier 20 are not shown or described in detail because they are adequately described in the aforementioned U.S. Pats. As indicated before, however, the photoelectric means 16 scans the pattern contour image at a reference frequency of 60 hertz and the output of the preamplifier is a fluctuating signal which includes the reference frequency component, the amplitude and phase of which indicate the amount and direction of transverse deviation of the photosensitive means from the pattern contour. It the case of line tracing the output of the preamplifier also includes a second harmonic component of 120 hertz which is present only when the photosensitive means 16 is viewing at least a portion of the pattern line and may be used as an indication of when the sensing head is on or off the line.

The signal from the output of the sensing head preamplifier normally controls the operation of the steering means 12 which is made up of the gated amplifier 26, drive amplifier 22 and the steering motor 24. The fluctuating signal on the output conductor 73 from the sensing head is applied to the base of a transistor 74 which is connected as a common emitter amplifier. The potentiometer 76 in the emitter circuit of the transistor 74 serves as a gain control for the steering circuit in a well-known manner. An inductance 78 and capacitor 80 filter the output from the amplifier 75 so that only the reference frequency component or 60 hertz signal is passed through capacitor 82 to the center contact 84a of a manual steering control switch 84. The outer two contacts 84b and 84c are connected to opposite phase components of a reference AC source so that by operator manipulation, a signal may be provided through the remainder of the circuit to cause the steering motor 24 to turn in one direction or the other. When the switch 84 is in its center position, however, the steering circuit 12 can be operated responsive to the signal from the sensing head and the amplified fluctuating signal is applied to the base of a second transistor 86 which is also connected as a common emitter amplifier 87. The phase and amplitude-responsive fluctuating signal from the collector of transistor 86 is coupled through capacitor 88 to the primary 90 of a transformer 92, the secondary 94 of which provides the input to the drive amplifier 22 for energizing the steering motor 24. The steering motor 24 is operable in accordance with the phase and amplitude of the output of the drive amplifier 22 to steer the sensing head 10 with respect to the pattern contour in a well-known manner so that these circuits need not be described in detail.

As previously mentioned, the amplifier 26 is a gated type, the gating function being performed by a PNP transistor 96 which is operable responsive to the circuits shown in FIGS. 5 and 6 to short out the primary 90 during the leadin procedures of the tracer to the pattern contour at the beginning of the tracing operation. As indicated with respect to the functional diagram in FIG. 1, the gated amplifier 26 is controlled in part by the status of the off-pattern detection circuits. These circuits are shown in FIG. 5 and operate responsive to the output signal of the sensing head preamplifier 20 on conductor 73, which in the case of the line-tracing mode will contain a 60 hertz component and/or a 120 hertz component, dependent upon whether the photosensitive means 16 is centered on the line or is slightly off the line. If the pattern line is not being viewed at all, there will be virtually no fluctuating component in the preamplifier output signal.

The sensing head signal from the output of the preamplifier 20 is applied to the input of the off-pattern detector 32 at the base of transistor 98. The transistor 98, connected as a common emitter amplifier 100, amplifies the sensing head signal and transmits it through coupling capacitor 102 to the base of a PNP transistor 104 also acting as a common emitter amplifier 106. The emitter circuit of the amplifier 100 includes a set of contacts 18b forming a part of the line-edge selector control 18 so that the gain of the amplifier may be selectively controlled by means of potentiometers 108a, 108b to determine the proper operating points of the off-pattern circuits.

The transistor 104 conducts only on the negative swings of the fluctuating signal appearing on its base and charges a capacitor 110 in its collector circuit in accordance with the absolute amplitude of the fluctuating signal received from the scanning head. The voltage level of the capacitor 110 determines the state of the trigger function circuit 50 which comprises transistors 112 and 114. The trigger circuit 50 is similar to a Schmidt trigger except that in its quiescent condition both transistors 112 and 114 are nonconducting. That is, with no incoming signal from the sensing head, the base of transistor 112 is essentially at ground voltage with its emitter at a positive voltage by the action of the voltage-dividing resistors 116, 118 and 120 to maintain it nonconductive. The PNP transistor 114 therefore is also nonconducting in view of its direct connection to the collector of NPN transistor 112. The charge level at which the capacitor 110 switches the trigger circuit 50 from one state to another is determined by the reverse bias provided by the voltage divider formed by resistors 116, 118 and 120. The sensing head signal levels which are necessary to reach that capacitor charge level are represented as the off-line and off-edge threshold levels indicated in FIGS. 2b and 3b, and the position of the tracer with respect to the pattern contour to cause the trigger circuit 50 to switch is determined by the setting of the gain control potentiometers 108a and 108b in the amplifier 100.

Thus, in the case where the system is being used as a pattern line tracer, the trigger circuit 50 will be held in its state where both transistors 112 and 114 are not conducting as the tracer approaches the line until enough of the pattern line is viewed to cause capacitor 110 to charge above the off-line threshold. Trigger function circuit 50 then quickly flips to its conducting state to provide a high signal at the collector of transistor 114 and hence through resistor 122 to the base of transistor 124.

Of course, these circuits operate in the opposite mode when the tracer is being used as an edge control. It will be recalled that the signal from the output of the preamplifier 20 in the sensing head 10 is at maximum absolute value when the photosensitive means 16 is not viewing a segment of the pattern edge. Thus, the capacitor 110 is charged to a maximum value when the tracer is not viewing a portion of the edge and the transistors 112, 114 of the trigger circuit 50 are in their conducting state. As the tracer approaches the edge, the charge on the capacitor 110 will fall to a level at which the transistors 112, 114 will switch to their nonconducting condition to provide a low signal to the base of transistor 124.

When the trigger circuit 50 is in its conducting state to present a positive voltage to transistor 124, it also conducts to present a low signal on conductor 126 connected to its collector. This low is inverted by transistor 128 so that the signal at conductor 130 connected to the collector of transistor 128 is high whenever the trigger function circuit 50 is in its conducting condition. When the tracer is in its line-following mode, the signal on conductor 130 is passed through the line-edge switch contacts 18c to one input of the AND circuit 52 formed by diodes 132,, 134. This signal of course is high when the trigger circuit 50 is in its conducting condition indicating that the tracer is viewing the line and is low when the tracer is off the line.

It is to be noted that when the tracer is in the edge tracing mode the signal delivered to the AND gate 52 is taken from conductor 126 because the trigger circuit 50 is in its nonconducting state when the tracer is viewing a portion of the edge and the input to diode 132 must be positive when the tracer is on the edge or on the line. Under normal operating conditions when the tracer is properly following the pattern contour, the other input to the AND gate 52 at the cathode of diode 134 is also high so that a high is provided through the OR gate 54 formed by resistors 138, 140 and 142 to the base of transistor 136. The transistor 136 forms part of the off-pattern relay and driver circuit 34 and serves to drive the off-pattern relay solenoid 144 in its collector circuit. Transistor 136 is conducting when the tracer is properly following the pattern contour so that the feed motor contacts 34a are closed to permit driving of the tracer along the contour. The other input to the OR gate 54 through resistor 143 permits driving the tracer towards the pattern contour even though a portion thereof is not being viewed by the sensing head as previously described.

The pattern-catching logic function circuits shown in FIG. 6 utilize the sensing head output signal on conductor 73 and in the case of line tracing the signal status on conductor 130 from the collector of transistor 128 in the off-pattern circuit in FIG. 5. The conductor 130 signals the status of the A function discussed with respect to FIG. 1, the 1 state of which indicates that the tracer is viewing the line.

The logic function circuits schematically shown in FIG. 6 perform the task of maintaining the steering means 12 inoperable as the tracer is driven towards the pattern contour until the tracer reaches a predetermined position closely adjacent the contour. At that point the steering means is enabled to operate to steer the tracer onto the contour and from there on operate in a normal tracing manner.

The status of the steering circuits is determined by the condition of the flip-flop 58 which may be seen comprises NPN transistors 146 and 148 connected in a well-known manner. That is if the $\overline{F}$ function on conductor 150 connected to the collector of transistor 148 is in its high or 1 condition, the steering means may control the rotation of the sensing head 10 through AND gate 52, provided of course, that the sensing head is viewing a portion of the contour pattern. The F function on conductor 152 connected to the collector of transistor 146 controls the status of the off-pattern relay and driver circuit 34 through OR gate 54 to enable driving of the sensing head towards the line as previously mentioned.

The initial status of the flip-flop 58 is controlled by the start switch 56 which has the effect of turning transistor 146 off and transistor 148 on so that the $\overline{F}$ function on conductor 150 goes essentially to ground and the F function on conductor 152 goes to approximately the source voltage level. The high F function on conductor 152 is transmitted through the OR gate 54 (FIG. 5) to the base of transistor 136 causing it to conduct through the relay 144 and thus cause the feed motor to drive the tracer towards the pattern contour. The low $\overline{F}$ function on conductor 150 is applied to the cathode of diode 134 in the AND gate 52 and the low output of the AND gate is transmitted via conductor 154 and through resistor 156 (FIG. 4) to the base of the PNP gating transistor 96 in the steering circuit 12. Transistor 96 thus conducts and acts as a short circuit across the transformer primary 90 to prevent steering signals from passing therethrough to the steering motor 24.

The flip-flop 58 will remain in this state until the remainder of the logic function circuits of FIG. 6 determine that the tracer has reached the predetermined distance from the contour pattern, at which point the tracing means is enabled to steer the tracing head smoothly onto the pattern contour. To this end the sensing head output signal from the output of the preamplifier 20 is provided on conductor 73 and through resistor 158 to the 60 hertz reference frequency pass filter 62 made up of inductors 160, 162 and capacitors 164, 166. The reference frequency 60 hertz signal is applied to the base of transistor 168 which is connected as a common collector amplifier. Its output is taken across the emitter resistor 170 and transmitted through a coupling capacitor 172 and resistor 174 to an amplifying circuit 176 which may be of any appropriate type to amplify and fundamental reference frequency component. In the preferred embodiment the amplifier 176 is an integrated circuit operational amplifier, but it is well recognized that other amplifying means can well be used. It is because of the use of an operational amplifier that the circuits therebeyond in FIG. 6 are related to the three voltage levels of + 23 volts, +12 volts and ground.

The output of the amplifier 176 on conductor 178 is connected to one input of the gated AND circuit 60 through resistor 180 and to the inverter circuit 66 through resistor 182. The other input to the gated AND circuit 60 is received either from the off-pattern control on conductor 130 through switch contacts 18a, conductor 185, diode 181 and resistor 184 , in the case of line tracing or from positive voltage source in the case of edge tracing. If the voltage on line 185 is high, the capacitor 186 may be charged in accordance with the amplitude of the signal on conductor 178 by means of resistor 180 and resistor 188. When the charge on capacitor 186 builds up to a certain level representative of the absolute amplitude of the fluctuating signal on conductor 178, a silicon-controlled rectifier which forms the memory cell 70 is gated into conduction in a well-known manner. The amplitude level of the fluctuating signal on conductor 178 at which the memory cell 70 is gated on is determined by the values of resistors 180, 188 and determines the B1 threshold level. The anode of memory cell SCR 70 is connected to the base of a normally conducting transistor 190 which is turned off whenever the SCR 70 conducts. The collector circuit of the transistor 190 therefor represents the Q input to the AND gate 68 which will be described more fully hereinafter.

The output of the operational amplifier 176 on conductor 178 is also applied to the base of the inverter transistor 192. This transistor is normally biased below cutoff. The output of the operational amplifier on conductor 178 is approximately midway between ground and the source voltage when there is no 60-cycle signal applied thereto which is the voltage appearing at the cathode of zener diode 195 and hence the emitter of transistor 192. Thus, the voltage dividing effect of resistors 182, 194 provides a reverse biasing voltage at the base of the transistor 192. Whenever the operational amplifier has a fluctuating signal at its output with an amplitude sufficient to overcome the reverse bias, the transistor 192 will conduct during each portion of the positive swings in excess of the reverse bias. The sensing signal level required to overcome the reverse bias transistor 192 establishes the $B_2$ threshold level of FIGS. 2b and 3b. When the transistor 192 conducts it provides a discharge path for a capacitor 198 through a low value resistor 196 in its collector circuit.

In the line-tracing mode the capacitor 198 is chargeable towards the source voltage whenever the transistor 192 is nonconducting through the path including resistor 200, resistor 202, switch contact 18a, conductor 130 and resistor 204 (FIG. 5); provided, of course, that transistor 128 is not conducting signifying the high A function and that transistor 190 (FIG. 6) is not conducting indicating the high Q function. There will thus appear on conductor 206 leading to the base of transistor 208 a signal having the characteristics indicated by the waveform 210. That is, as long as a line is being viewed as indicated by a high A function, the B1 threshold level has been previously reached as indicated by a high Q function, and the signal level on conductor 178 has an amplitude level great enough to trigger transistor 192 into conduction, a sawtooth waveform will appear on conductor 206 leading to the base of transistor 208. The time constant of the charging circuits for capacitor 198 is selected so that the peak voltage of the sawtooth never reaches the source voltage between the periodic conduction states of transistor 192. The circuits of transistor 208 are arranged so that it will not be triggered into conduction whenever the sawtooth signal is present at its base but will be triggered into conduction by the steady source voltage. The zener diode 212 and resistor 214 in the emitter circuit connection to the base of the flip-flop transistor 146 govern the level at which transistor 208 will conduct and are selected such that it will turn on at a level between the maximum peak of the sawtooth waveform and the source voltage level. Thus, transistor 208 conducts only when the signal level on conductor 178 drops below the $B_2$ threshold level and the conduction of transistor 208 then provides the reset signal to the flip-flop 58.

In summary, the inverter circuit 66 and AND circuit 68 cooperate to maintain the flip-flop 58 in its set state as established by the initial operation of button 56 until the tracer arrives at the predetermined position closely adjacent the pattern contour. For example, in line tracing when the sensing head is not viewing the line, both the Q function and the A function are low and the transistor 208 is held off by the low voltage on conductor 206. When the sensing head starts to sense the line the signal amplitude begins to increase and eventually surpasses the $B_2$ level at which the reverse bias of transistor 192 is overcome. Transistor 192 doesn't conduct at this time, however, because of its low collector voltage until both the off-line threshold (A function) and the B1 threshold (Q function) are reached. When the tracer gets close enough to the line to satisfy the A and Q functions, transistor 192 can conduct and the sawtooth signal appears on conductor 206. Transistor 208 is still not able to conduct and remains off until the 60 hertz signal level falls below the $B_2$ level at which transistor 192 can no longer conduct. Since the Q and A functions are both high at this time, the capacitor 198 can charge uninterrupted toward the source voltage and will reach the level at which transistor 208 is forward biased into conduction. The flip-flop 58 is then reset and opens the gate 92 in the steering circuit to permit the normal operation of the system to follow along the pattern line.

The system works similarly in the edge-tracing mode, but since there is no ambiguous preliminary situation, the off-pattern threshold (A function) and B1 threshold (Q function) are not significant to the operation. When the system is being used as an edge tracer the switch contacts 18b are therefore connected to the source voltage rather than to the off-pattern circuit in FIG. 5. The Q function is established immediately when the tracer is started toward the edge from a position off of the edge because of the maximum amplitude-sensing head signal on conductor 178 at that point which is ended with the source voltage on conductor 185 through diode 182 and resistor 184. SCR 70 is turned on which turns transistor 190 off to provide a high Q signal to the collector circuit of transistor 192. Since the 60 hertz sensing head signal is greater than the $B_2$ level at that time, the sawtooth signal immediately appears at conductor 206 to maintain transistor 208 nonconducting. When the predetermined position close to the edge is reached, the signal amplitude falls below the $B_2$ threshold. Transistor 192 is cut off completely permitting capacitor 198 to charge up and trigger transistor 208 into conduction. The flip-flop resets and the tracer smoothly catches the edge and follows it in the normal manner.

While there has been described herein a preferred embodiment of the invention, it is to be understood that modifications and additions may be made thereto without materially deviating from the teachings of the invention. It is therefore intended to be bound only by the scope of the appended claims.

We claim:

1. A pattern contour-tracing system comprising a rotatable pattern sensing head having a front-to-back axis, means for driving the sensing head in the direction of the front-to-back axis, means for automatically rotating the sensing head responsive to deviations of the position of said sensing head from said contour to cause said sensing head to follow said pattern contour, control means for causing the sensing head to catch the contour from a position off of the contour, said control means comprising means for pointing the front-to-back axis toward the contour, means including said drive means for causing said sensing head to approach the pattern, means for detecting when the sensing head reaches a position a predetermined distance from the contour, and means responsive to said detecting means for preventing the operation of said automatic rotating means until the sensing head reaches said predetermined distance position.

2. In the pattern contour-tracing system of claim 1 wherein said sensing head comprises sensing means for producing an electrical signal the amplitude of which is indicative of the transverse deviation of said sensing head from the contour, and wherein said detecting means operates responsive to said electrical signal.

3. In the system of claim 2 wherein said sensing means are adapted to produce an electrical signal the amplitude of which approaches a first predetermined level as the sensing head approaches the pattern contour, and wherein said detecting means causes said preventing means to maintain said automatic rotating means inoperable until the amplitude of said electrical signal is within a predetermined range of said first predetermined level, the amplitude level of the outer limit of said predetermined range being representative of said predetermined distance.

4. In the system of claim 3 wherein said detecting means comprises means operable responsive only to an electric signal which reaches said outer limit amplitude level from a level outside of said predetermined range to disenable said preventing means to activate said rotating means.

5. In the system of claim 4 wherein said disenabling means comprises a memory cell operable responsive only to an electric signal amplitude level outside of said predetermined range and a gate operable responsive to the operation of said memory cell and the subsequent attainment of said outer limit amplitude level the output of which controls said preventing means.

6. In the system of claim 2 wherein said sensing means is adapted to produce an electric signal the absolute amplitude of which drops toward a minimum as the sensing head approaches the contour, and wherein said detecting means causes said preventing means to maintain said automatic rotating means inoperable until the amplitude of said electrical signal drops below a predetermined amplitude level above said minimum representative of said predetermined distance.

7. In the system of claim 6 wherein said detecting means comprises means operable responsive only to a decreasing absolute amplitude signal to said predetermined level for disenabling said preventing means to activate said rotating means.

8. In the system of claim 7 wherein said disenabling means comprises a memory cell operable responsive only to an absolute amplitude signal greater than said predetermined level and a gate operable responsive to the operation of said memory cell and the subsequent attainment of said predetermined absolute amplitude level signal the output of which controls said preventing means.

9. A pattern contour-tracing system comprising a sensing head rotatable about an axis and having a front-to-back axis, means for driving said head in the direction of said front-to-back axis, photosensitive means in said head, means for projecting an image of a portion of said pattern forward of said rotational axis on said photosensitive means to cause same to produce electrical signals indicative of deviations of said photosensitive means from the image of said pattern contour, means for automatically rotating said sensing head toward said contour responsive to said electrical signals to cause same to follow said contour, and control means for causing the sensing head to automatically catch and follow said contour from a position off of said contour, said control means comprising means for pointing the front-to-back axis toward the pattern contour, means including said driving means for causing said sensing head to approach the pattern, means including said photosensitive means for detecting when the sensing head reaches a position a predetermined distance from the contour, and means responsive to said detecting means for preventing the operation of said automatic rotating means until the sensing head reaches said predetermined distance position.

10. In the system of claim 9 wherein said photosensitive means are adapted to produce an electric signal the amplitude of which approaches a first predetermined level as the sensing head approaches the pattern contour, and wherein said detecting means causes said preventing means to maintain said automatic rotating means inoperable until the amplitude of said electric signal is within a predetermined range of said first predetermined level, the amplitude level of the outer limits of said predetermined range being representative of said predetermined distance.

11. In the system of claim 10 wherein said detecting means comprises means operable responsive only to an electric signal which reaches said outer limit amplitude level from a level outside of said predetermined range for disenabling said preventing means to activate said rotating means.

12. In the system of claim 11 wherein said disenabling means comprises a memory cell operable responsive only to an electric signal amplitude level outside of said predetermined range and a gate operable responsive to the operation of said memory cell and the subsequent attainment of said outer limit amplitude level, the output of which controls said preventing means.

13. In the system of claim 9 wherein said photosensitive means is adapted to produce an electric signal the absolute amplitude of which drops toward a minimum as the sensing head approaches the contour, and wherein said detecting means causes said preventing means to maintain said automatic rotating means inoperable until the amplitude of said electrical signal drops below a predetermined amplitude level above said minimum representative of said predetermined distance.

14. In the system of claim 13 wherein said detecting means comprises means operable responsive only to a decreasing absolute amplitude signal to said predetermined level for disenabling said preventing means to activate said rotating means.

15. In the system of claim 14 wherein said disenabling means comprises a memory cell operable responsive only to an absolute amplitude signal greater than said predetermined level and a gate operable responsive to the operation of said memory cell and the subsequent attainment of said predetermined absolute amplitude level signal the output of which controls said preventing means.

16. In the system of claim 9 in which said pattern contour is a line and wherein said photosensitive means is adapted to scan the image of said pattern across a centerline of scan corresponding to said front-to-back axis at a reference frequency to produce a fluctuating signal, said electrical signal being a reference frequency component of said fluctuating signal which is present whenever an image of said pattern is being scanned except when the centerline of scan is aligned with the image of said pattern line.

17. In the system of claim 13 in which said pattern contour is a line and wherein said photosensitive means is adapted to scan the image of said pattern across a centerline of scan corresponding to said front-to-back axis at a reference frequency to produce a fluctuating signal, said electrical signal being a reference frequency component of said fluctuating signal which is present whenever an image of said pattern is being scanned except when the centerline of scan is aligned with the image of said pattern line.

18. In the system of claim 15 in which said pattern contour is a line and wherein said photosensitive means is adapted to scan the image of said pattern across a centerline of scan corresponding to said front-to-back axis at a reference frequency to produce a fluctuating signal, said electrical signal being a reference frequency component of said fluctuating signal which is present whenever an image of said pattern is being scanned except when the centerline of scan is aligned with the image of said pattern line.

19. In the system of claim 9 in which said pattern contour is an edge formed on the pattern between two contrasting colors, and wherein said photosensitive means is adapted to scan said edge at a reference frequency to produce a fluctuating signal, said electrical signal being a reference frequency component of said fluctuating signal which is present when said photosensitive means is not aligned with said edge and is absent when said photosensitive means is aligned with said edge.

20. In the system of claim 13 in which said pattern contour is an edge formed on the pattern between two contrasting colors, and wherein said photosensitive means is adapted to scan said edge at a reference frequency to produce a fluctuating signal, said electrical signal being a reference frequency component of said fluctuating signal which is present when said photosensitive means is not aligned with said edge and is a absent when said photosensitive means is aligned with said edge.

21. In the system of claim 15 in which said pattern contour is an edge formed on the pattern between two contrasting colors, and wherein said photosensitive means is adapted to scan said edge at a reference frequency to produce a fluctuating signal, said electrical signal being a reference frequency component of said fluctuating signal which is present when said photosensitive means is not aligned with said edge and is absent when said photosensitive means is aligned with said edge.